United States Patent
Lin et al.

(10) Patent No.: US 9,876,995 B2
(45) Date of Patent: Jan. 23, 2018

(54) IMAGE SENSOR

(71) Applicant: VisEra Technologies Company Limited, Hsin-Chu (TW)

(72) Inventors: Kuo-Feng Lin, Kaohsiung (TW); Wu-Cheng Kuo, Hsin-Chu (TW); Chung-Hao Lin, Keelung (TW); Yu-Kun Hsiao, Hsin-Chu (TW)

(73) Assignee: VISERA TECHNOLOGIES COMPANY LIMITED, Hsin-Chu (TW)

( * ) Notice: Subject to any disclaimer, the term of this patent is extended or adjusted under 35 U.S.C. 154(b) by 144 days.

(21) Appl. No.: 14/959,928

(22) Filed: Dec. 4, 2015

(65) Prior Publication Data
US 2017/0160133 A1 Jun. 8, 2017

(51) Int. Cl.
*H04N 9/04* (2006.01)
*H04N 9/083* (2006.01)
(Continued)

(52) U.S. Cl.
CPC ............ *H04N 9/045* (2013.01); *G01J 3/0205* (2013.01); *G01J 3/0224* (2013.01); *G01J 3/0237* (2013.01); *G01J 3/1895* (2013.01); *G01J 3/36* (2013.01); *G02B 5/1828* (2013.01); *G02B 5/1842* (2013.01); *G02B 6/29329* (2013.01); *G02B 6/29395* (2013.01); *G02B 6/29397* (2013.01); *H04N 5/3696* (2013.01); *H04N 9/083* (2013.01); *G01J 2003/1204* (2013.01); *G01J 2003/1213* (2013.01)

(58) Field of Classification Search
CPC ...... H04N 5/3696; H04N 9/045; H04N 9/083; G01T 3/1895; G01T 2003/1204; G01T 2003/1291; G02B 5/1828
See application file for complete search history.

(56) References Cited

U.S. PATENT DOCUMENTS 8,759,742 B2 * 6/2014 Yokogawa ........ H01L 27/14621
250/208.1
8,866,950 B2 * 10/2014 Yokogawa ........ H01L 27/14621
348/308

FOREIGN PATENT DOCUMENTS

JP  2002258199 A  9/2002
JP  2005207890 A  8/2005
(Continued)

OTHER PUBLICATIONS

Japanese Office Action corresponding to JP application No. 2016-070958 dated Apr. 4, 2017 and its English translation; pp. 1-10.
(Continued)

*Primary Examiner* — Daniel M Pasiewicz
(74) *Attorney, Agent, or Firm* — Muncy, Geissler, Olds & Lowe, P.C.

(57) ABSTRACT

The present invention provides an image sensor, including: a sensor array layer formed of a plurality of normal sensor units and a plurality of spectrometer sensor units; a first guided mode resonance (GMR) structure having a first grating pitch and disposed on the sensor array layer to cover N (where N is an integer) of the spectrometer sensor units; a second GMR structure having a second grating pitch and disposed on the sensor array layer to cover N of the spectrometer sensor units; and a plurality of color filter units disposed on the sensor array layer to cover the normal sensor units.

19 Claims, 16 Drawing Sheets

(51) Int. Cl.
    *H04N 5/369*     (2011.01)
    *G01J 3/02*     (2006.01)
    *G01J 3/36*     (2006.01)
    *G01J 3/18*     (2006.01)
    *G02B 5/18*     (2006.01)
    *G02B 6/293*     (2006.01)
    *G01J 3/12*     (2006.01)

(56) References Cited

FOREIGN PATENT DOCUMENTS

| | | |
|---|---|---|
| JP | 2008-177191 | 7/2008 |
| JP | 2010027875 A | 2/2010 |
| JP | 2010225944 A | 10/2010 |
| JP | 2010263158 A | 11/2010 |
| JP | 2012059865 A | 3/2012 |
| JP | 2012-151421 | 8/2012 |
| JP | 2013138055 A | 7/2013 |

OTHER PUBLICATIONS

Office Action of corresponding Japanese Application No. 2016-070958 dated Jul. 25, 2017 with English translation.

\* cited by examiner

IMAGE SENSOR

BACKGROUND OF THE INVENTION

Field of the Invention

The present disclosure relates to an image sensor, and in particular to an image sensor having a function of measuring the spectrum of non-polarized or polarized light.

Description of the Related Art

Image sensors have found wide application not only in digital cameras, but also in various mobile terminals such as cell phones. One kind of image sensor is a spectroscopic sensor used in spectrometers to measure a spectrum. By measuring a spectrum of light irradiated or reflected from an object, the characteristic features such as structure or composition of the object can be observed and analyzed.

A general spectroscopic sensor irradiates a subject with electromagnetic light from a visible light source, an infrared light source, or the like, and causes the reflected light or a light component shifted by Raman scattering to pass through a slit to be transmitted through or reflected by a grating. The spectroscopic sensor thereby obtains the signal intensity distribution in the wavelength direction.

However, the existing spectroscopic sensor is generally based on a plasma resonance structure, and can measure only the electromagnetic wave propagating in TM mode. In this regard, the present inventors provide a newly designed image sensor which cannot only capture images or videos, but also measure the spectrum of non-polarized or polarized light.

BRIEF SUMMARY OF THE INVENTION

A detailed description is given in the following embodiments with reference to the accompanying drawings.

The present disclosure provides an image sensor, including: a sensor array layer formed of a plurality of normal sensor units and a plurality of spectrometer sensor units; a first guided mode resonance (GMR) structure having a first grating pitch and disposed on the sensor array layer to cover N (where N is a positive integer) of the spectrometer sensor units; a second GMR structure having a second grating pitch and disposed on the sensor array layer to cover N of the spectrometer sensor units; and a plurality of color filter units disposed on the sensor array layer to cover the normal sensor units.

In an embodiment, the image sensor further includes: a clear structure having no gratings and disposed on the sensor array layer to cover N of the spectrometer sensor units. The image sensor can further include: a first polarizer polarizing light in a first direction is arranged on the first GMR structure, the second GMR structure, and the clear structure, wherein the grating of the first GMR structure and the second GMR structure is a line grating which is parallel to a second direction perpendicular to the first direction. The image sensor can further include: a third GMR structure having the first grating pitch and disposed on the sensor array layer to cover N of the spectrometer sensor units; a fourth GMR structure having the second grating pitch and disposed on the sensor array layer to cover N of the spectrometer sensor units; a second clear structure having no gratings and disposed on the sensor array layer to cover N of the spectrometer sensor units; and a second polarizer polarizing light in the second direction is arranged on the third GMR structure, the fourth GMR structure, and the second clear structure, wherein the grating of the third GMR structure and the fourth GMR structure is a line grating which is parallel to the first direction. In the image sensor, the first GMR structure measures a first signal, the second GMR structure measures a second signal, and the clear structure measures a reference signal, wherein the difference between the first signal and the reference signal, and the difference between the second signal and the reference signal constitute a measured spectrum.

In another embodiment, the first GMR structure is divided into a first grating area with the first grating pitch and a first clear area without gratings, and the second GMR structure is divided into a second grating area with the second grating pitch and a second clear area without gratings. The first clear area can be arranged at a side of the first grating area, and the second clear area can be arranged at a side of the second grating area. The first clear area can surround the first grating area, and the second clear area can surround the second grating area. The image sensor can further include: a first polarizer polarizing light in a first direction is arranged on the first GMR structure and the second GMR structure, wherein the grating of the first grating area and the second grating area is a line grating which is parallel to a second direction perpendicular to the first direction. The image sensor can further include: a third GMR structure divided into a third grating area with the first grating pitch and a third clear area without gratings, the third GMR structure disposed on the sensor array layer to cover N of the spectrometer sensor units; a fourth GMR structure divided into a fourth grating area with the second grating pitch and a fourth clear area without gratings, the fourth GMR structure disposed on the sensor array layer to cover N of the spectrometer sensor units; and a second polarizer polarizing light in the second direction is arranged on the third GMR structure and the fourth GMR structure, wherein the grating of the third grating area and the fourth grating area is a line grating which is parallel to the first direction. In the image sensor, the first grating area measures a first signal, the second grating area measures a second signal, the first clear area measures a first reference signal, and the second clear area measures a second reference signal, wherein the difference between the first signal and the first reference signal, and the difference between the second signal and the second reference signal constitute a measured spectrum.

In an embodiment, the first GMR structure and the second GMR structure are arranged successively. In another embodiment, the first GMR structure and the second GMR structure are arranged dispersively.

In an embodiment, the grating of the first GMR structure and the second GMR structure is a dot grating.

In an embodiment, the image sensor further includes: a high thermal conductive material between the first GMR structure and the sensor array layer, and between the second GMR structure and the sensor array layer, wherein the first grating pitch of the first GMR structure and the second grating pitch of the second GMR structure is varied by heating or cooling the first GMR structure and the second GMR structure via the high thermal conductive material.

In an embodiment, the image sensor further includes: a piezoelectric material arranged between the first GMR structure and the sensor array layer, and between the second GMR structure and the sensor array layer, wherein the first grating pitch of the first GMR structure and the second grating pitch of the second GMR structure is varied by changing a voltage applied to the piezoelectric material. In an embodiment, the first GMR structure and the second GMR structure are made of a piezoelectric material, wherein the pitch of the first GMR structure and the second GMR structure is varied by changing a voltage applied to the piezoelectric material.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
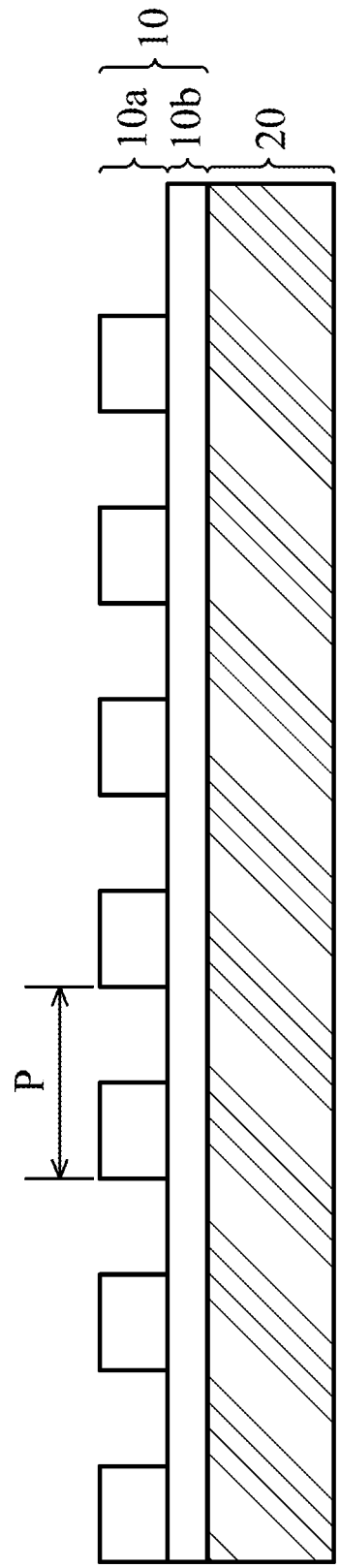
FIG. 1 is a schematic cross-sectional view of a part of a guided-mode resonance (GMR) structure.

FIG. 1 is a schematic cross-sectional view of a part of a guided-mode resonance (GMR) structure. As shown in FIG. 1, A GMR structure 10 is placed on an insulating layer (substrate) 20. The GMR structure 10 has a configuration, which includes a corrugated diffraction grating layer 10a periodically patterned with 1-dimensional rectangular grooves or 2-dimensional circular holes, and a planar waveguide layer 10b in contact with the diffraction grating layer 10a. The reference sign p indicates a grating pitch. Most light beams incident on the diffraction grating layer 10a behave almost the same as if they were incident on an area where there is no grating. For specific combinations of incident angles and light frequency, there is a resonance condition, allowing the diffraction grating layer 10a to couple the light beam into a guided mode of the waveguide layer 10b. The GMR structure 10 behaves like a mirror for the light beam phase matching the diffraction grating layer 10a. Therefore, the GMR structure 10 can be made as a filter to filter light beams with a specific wavelength. The grating pitch p can be adjusted to control the wavelength of the light beam to be filtered out.

Figure 2A:
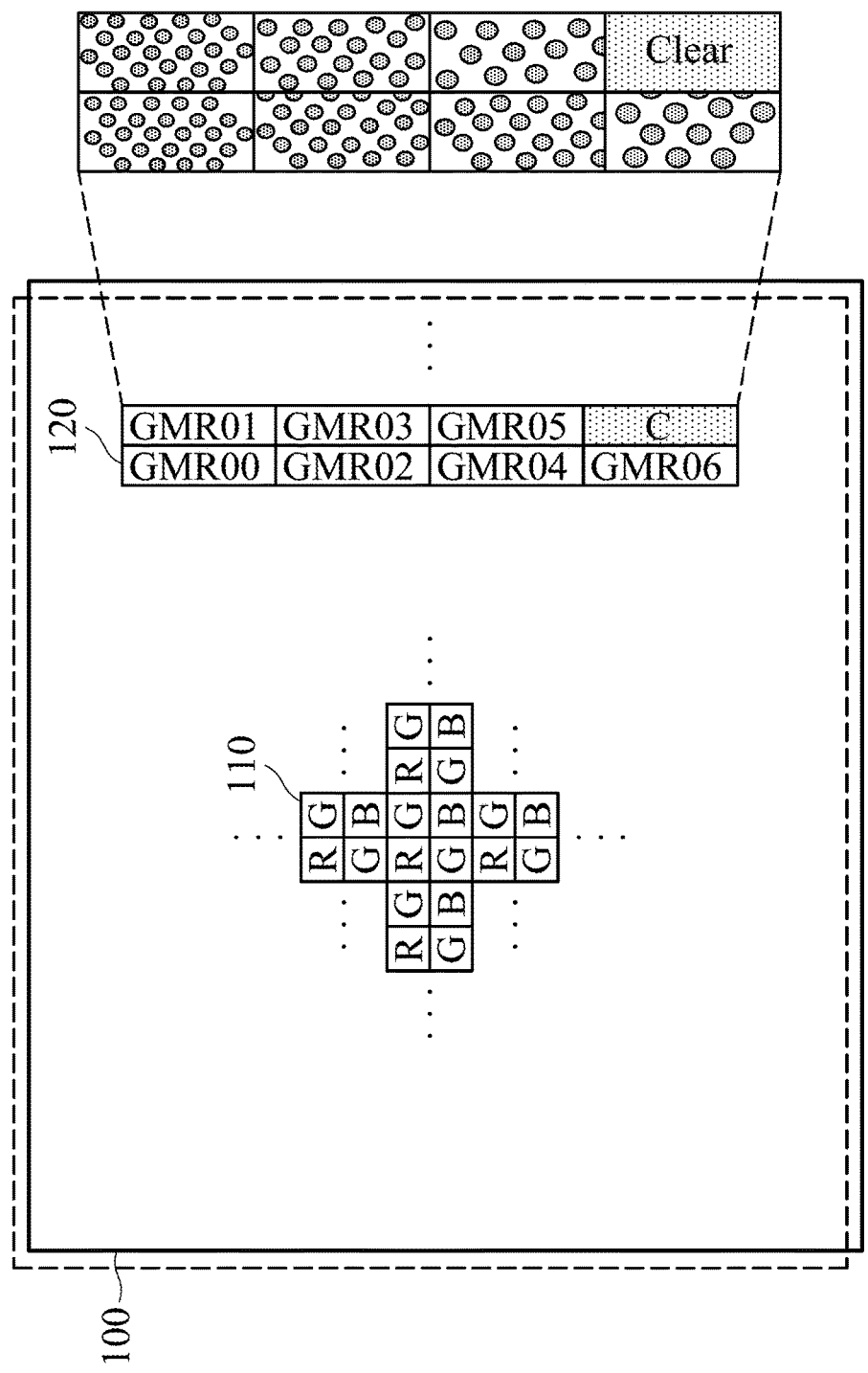
FIG. 2A is a schematic diagram showing a layout plan of an image sensor in accordance with an embodiment of the disclosure.
Figure 2B:
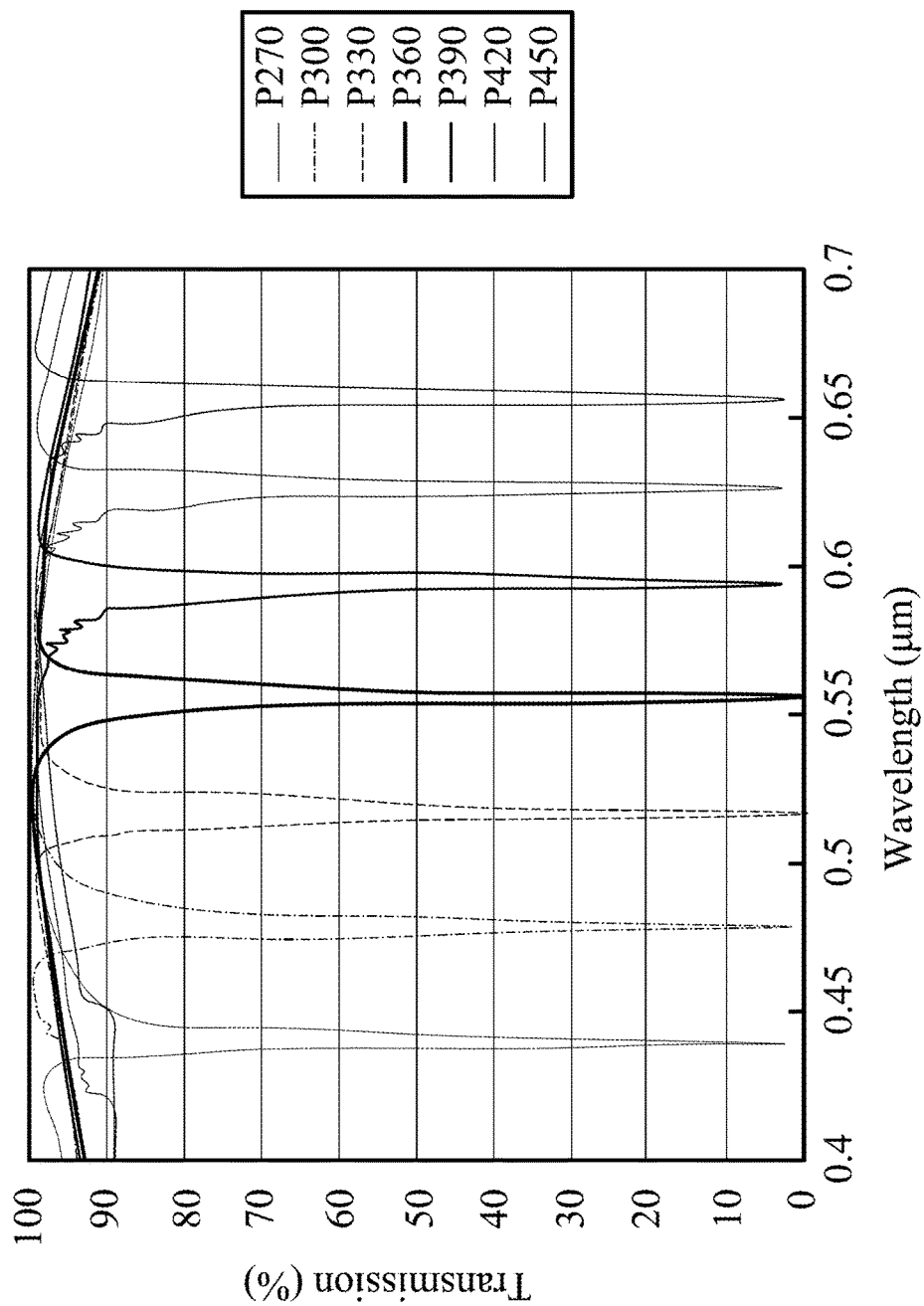
FIG. 2B is a diagram showing a transmission distribution in the wavelength direction measured by the image sensor shown in FIG. 2A.

FIG. 2A is a schematic diagram showing a layout plan of an image sensor in accordance with an embodiment of the disclosure. FIG. 2B is a diagram showing a transmittance distribution in the wavelength measured by the image sensor shown in FIG. 2A. As shown in FIG. 2A, an image sensor of the disclosure has a pixel array plane 100 where color filter units 110 and a GMR unit set 120 are disposed.

The GMR unit set 120 includes seven grating areas GMR00~GMR06 and a clear area C. Any of the grating areas GMR00~GMR06 and the clear area C is formed on a rectangular area occupying a certain number of pixels. The number of the pixels that forms a grating area or a clear area is not limited and can be any positive integer. For example, in FIG. 2A, any of the grating areas GMR00~GMR06 and the clear area C occupies an area equal to the area of four pixels. In this disclosure, the width and the length of one grating area or one clear area C is within 1.1 µm~4.4 µm. Any of the grating areas GMR00~GMR06 has a GMR structure as shown in FIG. 1. The top surface of grating areas GMR00~GMR06 is periodically patterned with 2-dimensional circular holes or columns. The grating areas GMR00~GMR06 have different grating pitches, forming seven channels to detect the intensity of incident light at seven different wavelengths, respectively. The clear area C is a planar layer without grating structure, which is used as a reference area allowing light at all wavelengths to pass through.

The color filter units 110 are the same as a common color filter array that passes red, green, or blue light to selected pixel sensors, respectively. In FIG. 2A, a Bayer pattern is applied to the color filter units 110.

In this embodiment, the grating areas GMR00~GMR06 and the clear area C are arranged successively. Namely, the grating areas GMR00~GMR06 and the clear area C are arranged on adjacent pixels. With this structure shown in FIG. 2A, the image sensor cannot only capture an image, but also detect a spectrum. The grating areas GMR00~GMR06, for example, have grating pitches 270 nm, 300 nm, 330 nm, 350 nm, 390 nm, 420 nm, and 450 nm, respectively. Under this configuration, each of the grating areas GMR00~GMR06 reflects light at seven specific wavelengths, and thus seven transmittance curves in the wavelength are obtained as shown in FIG. 2B. The reference signs P270, P300, P330, P350, P390, P420, and P450 indicate the transmittance curves respectively measured from the grating areas GMR00~GMR06. Each curve has an obvious valley at a specific wavelength. By arranging seven channels into a wavelength ranging from about 400 nm to 700 nm, a rough spectrum of visible band can be obtained. Note that the grating of the grating areas GMR00~GMR06 is a 2-dimensional symmetry structure, the transmittance curves of a transverse electronic (TE) wave and a transverse magnetic (TM) are the same.

Figure 3:
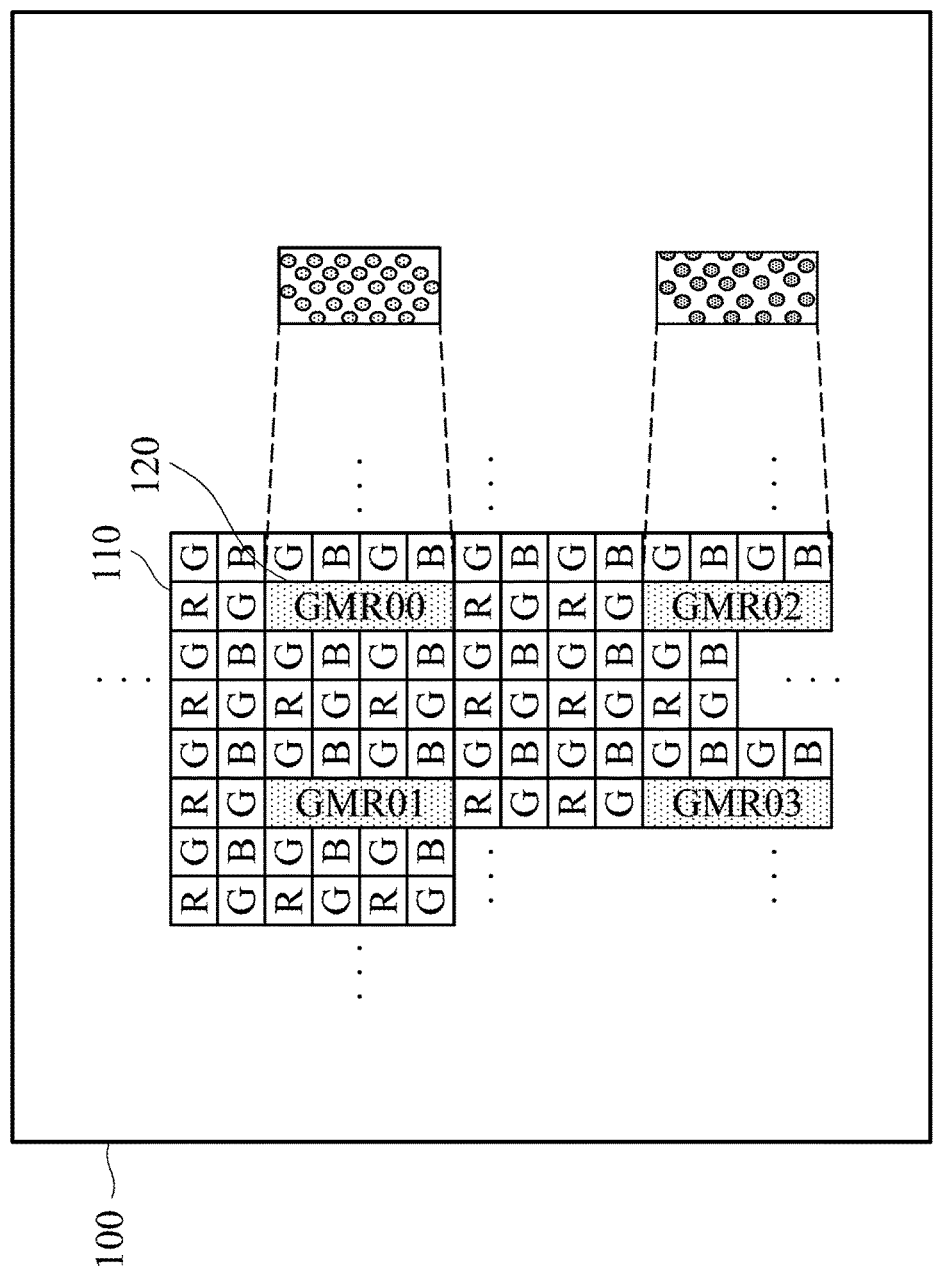
FIG. 3 is a schematic diagram showing a layout plan of an image sensor in accordance with another embodiment of the disclosure.

FIG. 3 is a schematic diagram showing a layout plan of an image sensor in accordance with another embodiment of the disclosure. As shown in FIG. 3, an image sensor of the disclosure also has a pixel array plane 100 where color filter units 110 and GMR unit set 120 are disposed. The structure and the characteristics of any of the grating areas GMR00~GMR06 and the clear area C are the same as those shown in FIG. 2A. However, the arrangement for the GMR unit set 120 is different. In this embodiment, the grating areas GMR00~GMR06 and the clear area C are arranged dispersively. Namely, the grating areas GMR00~GMR06 and the clear area C are individually distributed on the pixel array plane 100. Note that the grating areas GMR04~GMR06 and the clear area C are not shown in FIG. 3 because there is not enough space to depict all of the grating areas GMR00~GMR06 and the clear area C.

Figure 4A:
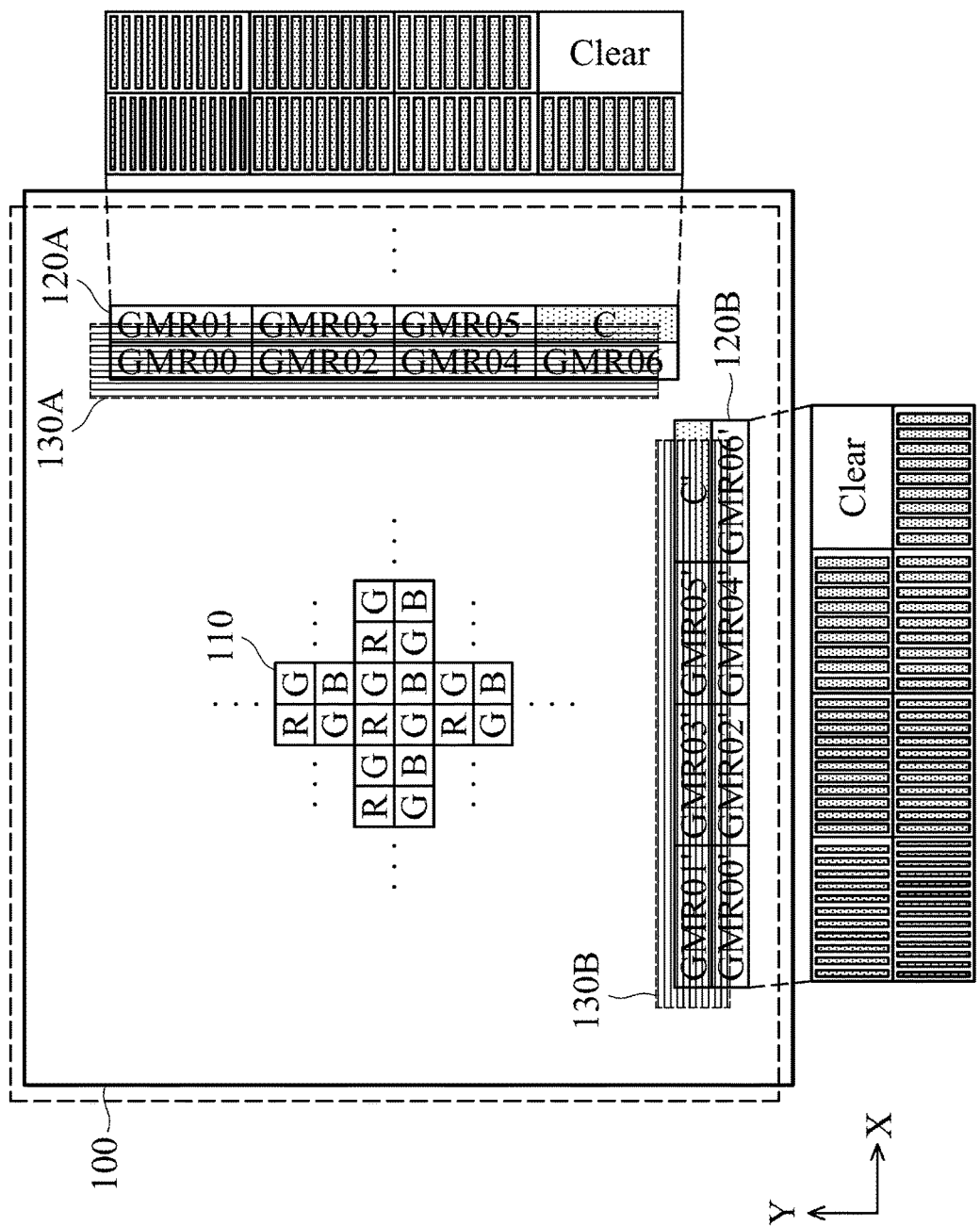
FIG. 4A is a schematic diagram showing a layout plan of an image sensor in accordance with another embodiment of the disclosure.
Figure 4B:
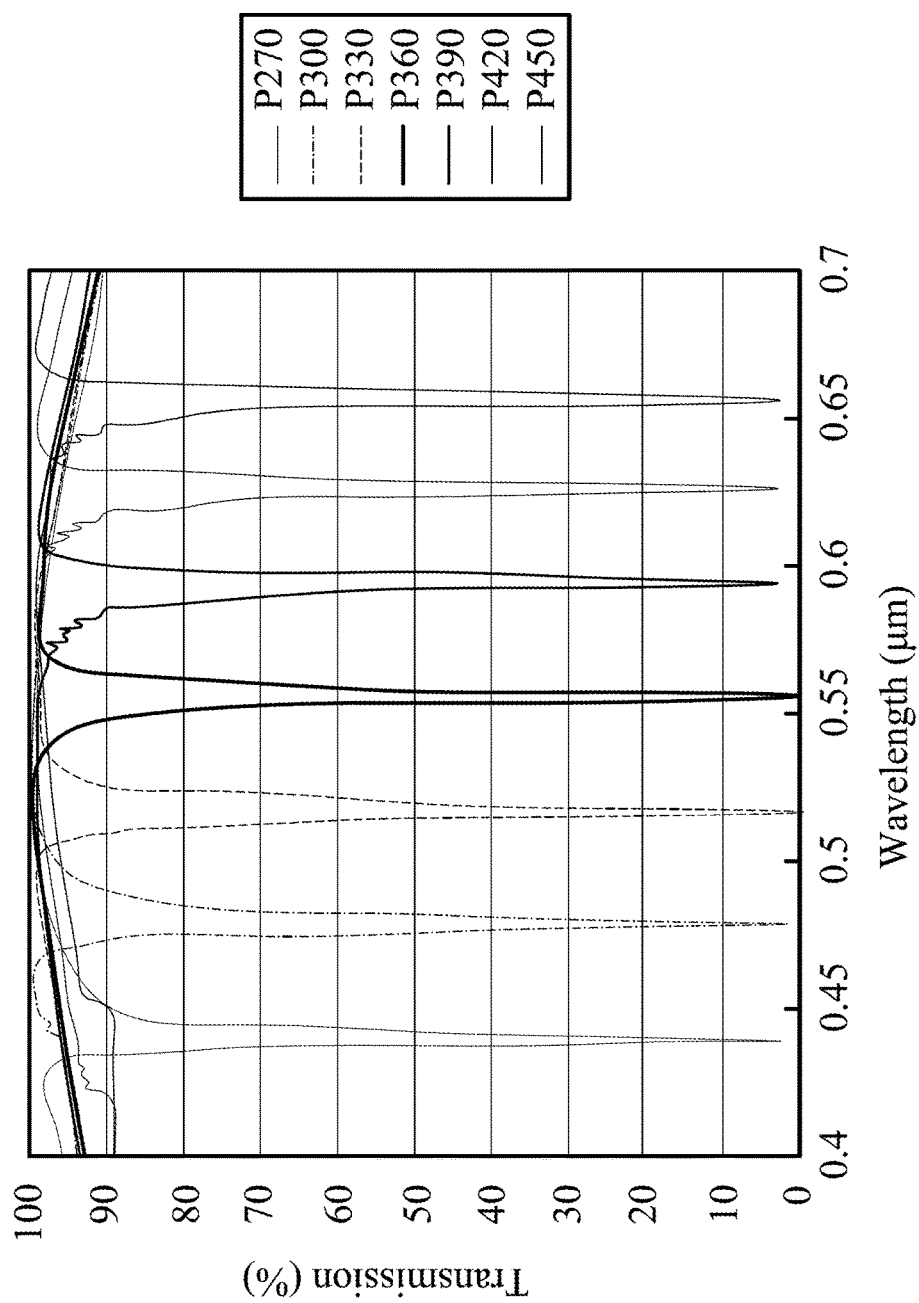
FIG. 4B is a diagram showing a transmittance distribution in the wavelength measured by the image sensor shown in FIG. 4A.

FIG. 4A is a schematic diagram showing a layout plan of an image sensor in accordance with another embodiment of the disclosure. FIG. 4B is a diagram showing a transmittance distribution in the wavelength measured by the image sensor shown in FIG. 4A. As shown in FIG. 4A, an image sensor of the disclosure has a pixel array plane 100 where color filter units 110 and GMR unit sets 120A and 120B are disposed. There are two GMR unit sets 120A and 120B disposed on the pixel array plane 100.

The GMR units 120A include seven grating areas GMR00~GMR06 with different grating pitches and a clear area C. The grating areas GMR00~GMR06 and the clear area C of the GMR unit set 120A extends in the column direction and arranged successively, the arrangement the same as the GMR unit set 120 shown in FIG. 2A. However, the top surface of grating areas GMR00~GMR06 is periodically patterned with 1-dimensional rectangular grooves rather than 2-dimensional circular holes or columns. The rectangular grooves are parallel to the row direction. Therefore, a TE wave and a TM wave incident to the same grating area generate different transmittance curves. In order to detect the transmittance curve of one of a pure TE wave and a pure TM wave, a polarizer 130A polarizing light in the column direction is disposed on the GMR unit set 120A including the grating areas GMR00~GMR06 and the clear area C.

Furthermore, the other GMR unit set 120B is also disposed to detect the transmittance curve of the other of the pure TE wave and the pure TM wave. The GMR unit set 120B includes seven grating areas GMR00'~GMR06' with different grating pitches and a clear area C'. The grating areas GMR00'~GMR06' and the clear area C' of the GMR unit set 120B extends in the row direction, and the rectangular grooves on the grating areas GMR00'~GMR06' are parallel to the column direction. A polarizer 130B polarizing light in the row direction is disposed on the GMR unit set 120B including the grating areas GMR00'~GMR06' and the clear area C'.

With the structure shown in FIG. 4A, the GMR unit set 120A is utilized to measure the spectrum of one of the TE wave and the TM wave and the GMR unit set 120B is utilized to measure the spectrum of the other of the TE wave and the TM wave. FIG. 4B shows seven transmittance curves in the wavelength under a TM mode measured by one of the GMR unit sets 120A and 120B. According to this embodiment, polarized spectrum can be obtained as well.

Figure 5:
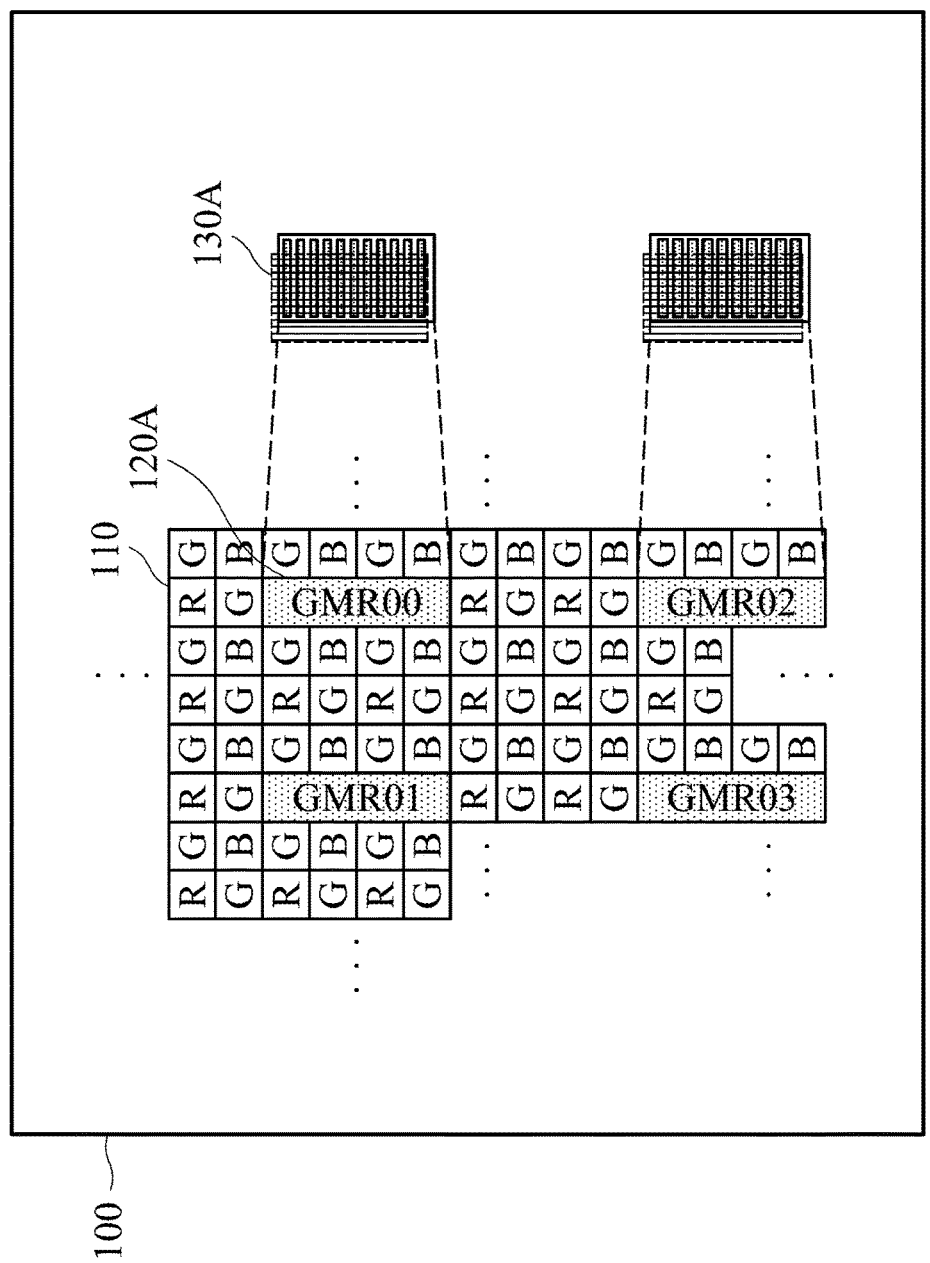
FIG. 5 is a schematic diagram showing a layout plan of an image sensor in accordance with another embodiment of the disclosure.

FIG. 5 is a schematic diagram showing a layout plan of an image sensor in accordance with another embodiment of the disclosure. As shown in FIG. 5, an image sensor of the disclosure also has a pixel array plane 100 where color filter units 110 and two GMR unit sets 120A and 120B are disposed. The structure and the characteristics of the GMR unit sets 120A and 120B are the same as those shown in FIG. 4A. However, the arrangement for the GMR unit sets 120A and 120B is different. In this embodiment, the grating areas GMR00~GMR06 (and GMR00'~GMR06') and the clear area C (and C') are arranged dispersively. Namely, the grating areas GMR00~GMR06 (and GMR00'~GMR06') and the clear area C (and C') are individually distributed on the pixel array plane 100. Here, the polarizer 130A has eight pieces covering the grating areas GMR00~GMR06 and the clear area C, respectively. The polarizer 130B has eight pieces covering the grating areas GMR00'~GMR06' and the clear area C', respectively. Note that FIG. 5 only shows the grating areas GMR00~GMR04 because there is not enough space to depict all of the grating areas GMR00~GMR06 (and GMR00'~GMR06') and the clear area C (and C').

Figure 6:
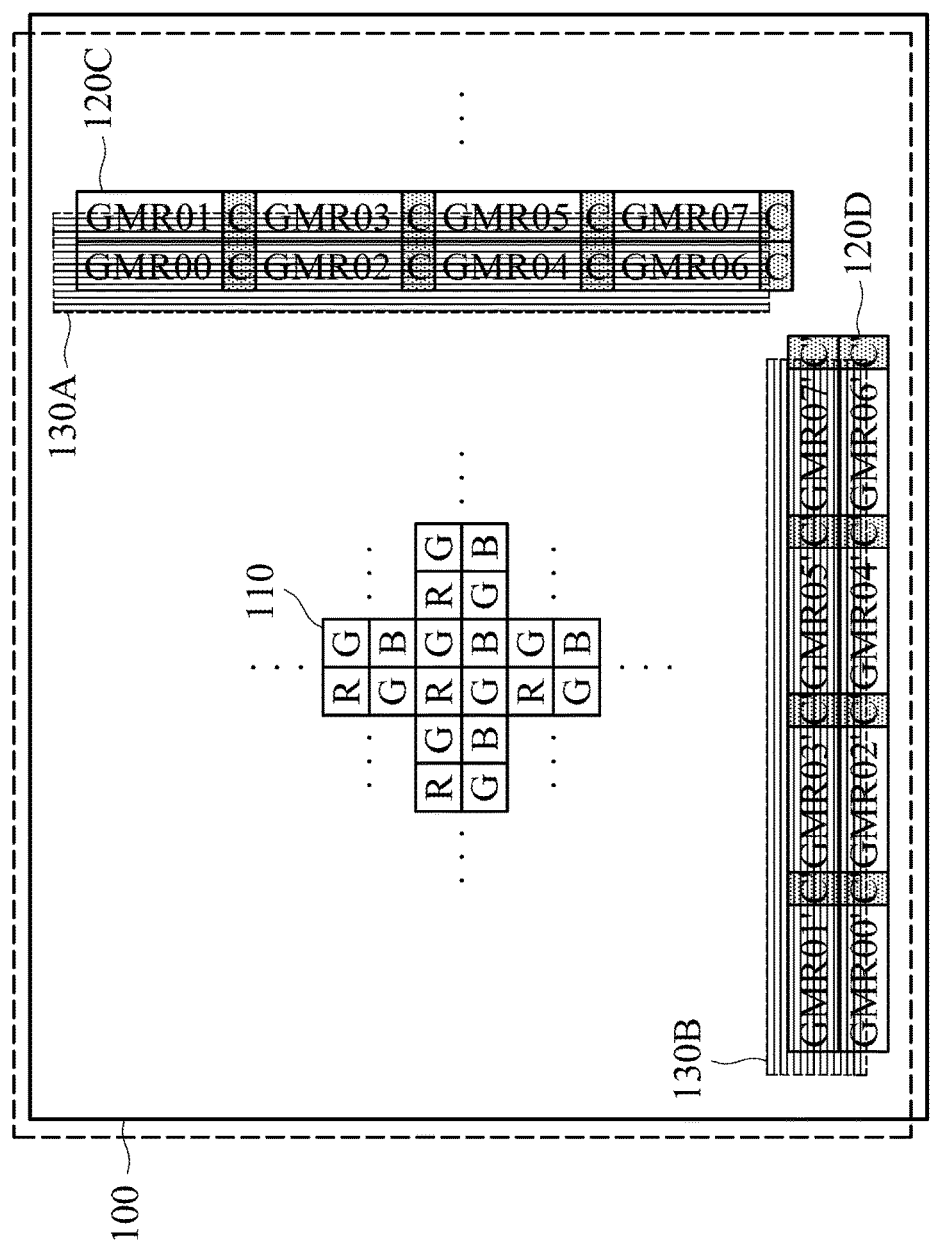
FIG. 6 is a schematic diagram showing a layout plan of an image sensor in accordance with another embodiment of the disclosure.

FIG. 6 is a schematic diagram showing a layout plan of an image sensor in accordance with another embodiment of the disclosure. As shown in FIG. 6, an image sensor of the disclosure has a pixel array plane 100 where color filter units 110 and two GMR unit sets 120C and 120D are disposed. In comparison with the arrangement shown in FIG. 4A, the clear area C is divided into eight portions. Each grating area GMR00~GMR07 is accompanied by a smaller clear area C. In FIG. 4A, the clear area C is arranged on the lower side of every GMR grating area GMR00~GMR07. Similarly, the clear area C' is divided into eight portions. Each grating area GMR00'~GMR07' is accompanied by a smaller clear area C'. Also, the clear area C' is arranged on the right side of every GMR grating area GMR00'~GMR07'. The polarizers 130A and 130B are still disposed above the GMR unit sets 120C and 120D, respectively. According to this embodiment, though the grating area and the clear area is smaller than in the previous embodiments, the number of spectrum measuring channels of one GMR unit set can be increased to eight.

Figure 7:
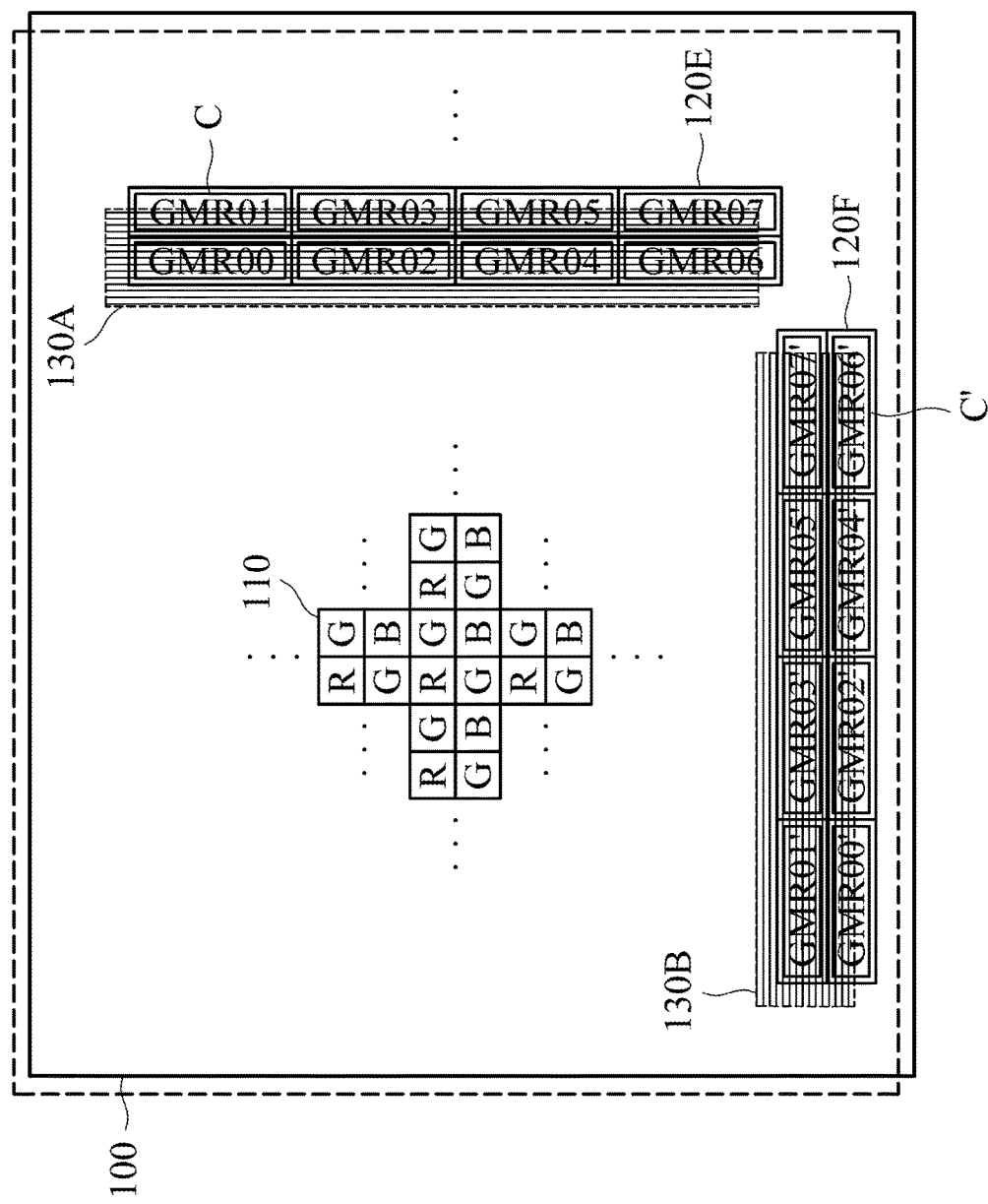
FIG. 7 is a schematic diagram showing a layout plan of an image sensor in accordance with another embodiment of the disclosure.

FIG. 7 is a schematic diagram showing a layout plan of an image sensor in accordance with another embodiment of the disclosure. As shown in FIG. 7, an image sensor of the disclosure has a pixel array plane 100 where color filter units 110 and two GMR unit sets 120E and 120F are disposed. Each grating area. GMR00~GMR07 is accompanied by a smaller clear area C, and each grating area GMR00'~GMR07' is accompanied by a smaller clear area C' as well. However, in comparison with the arrangement shown in FIG. 6, the clear area C (and C') is arranged not at a side of the GMR grating areas GMR00~GMR07 (and GMR00'~GMR07'), but at four sides of the GMR grating areas GMR00~GMR07 (and GMR00'~GMR07'). Namely, each of grating area GMR00~GMR07 is surrounded by a smaller clear area C, and each of grating area GMR00'~GMR07' is surrounded by a smaller clear area C'. The polarizers 130A and 130B are still disposed above the GMR unit sets 120E and 120F, respectively.

According to the embodiments shown in FIGS. 2A, 3, 4A, 5, 6, and 7, there are various arrangements for GMR unit sets to dispose on the pixel array plane. Those embodiments merely show some examples. The disclosure is intended to cover various modifications and combinations of those embodiments.

Figure 8:
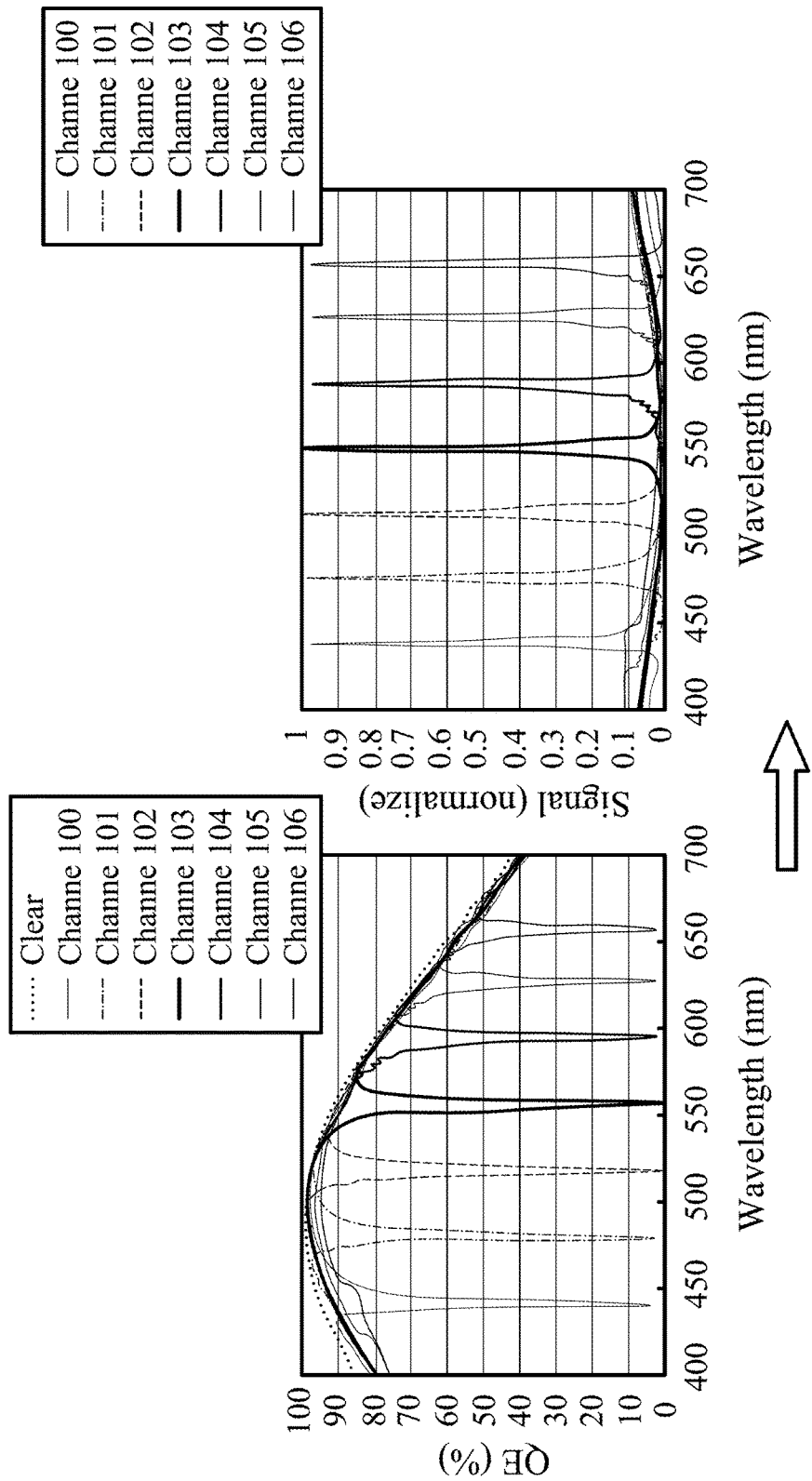
FIG. 8 is a diagram for explaining the method to obtain signals from spectrum measuring channels.

In the following paragraphs, the function of the clear area will be described briefly. FIG. 8 is a diagram for explaining the method to obtain signals from spectrum measuring channels. In FIG. 8A, seven channels 00~06 respectively measure the intensity (or the transmittance) of light at a specific wavelength is close to zero. However, it is not very intuitive to understand what the value means. Therefore, the intensities (or the transmittances) measured from the channels 00~06 are subtracted by the intensity (or the transmittance) measured from the clear area respectively to obtain positive values at seven specific wavelengths. Those values may be normalized as shown in FIG. 8B. Therefore, characteristic spectrums can be converted to digital numbers for ease of calculation and analysis.

Figure 9:
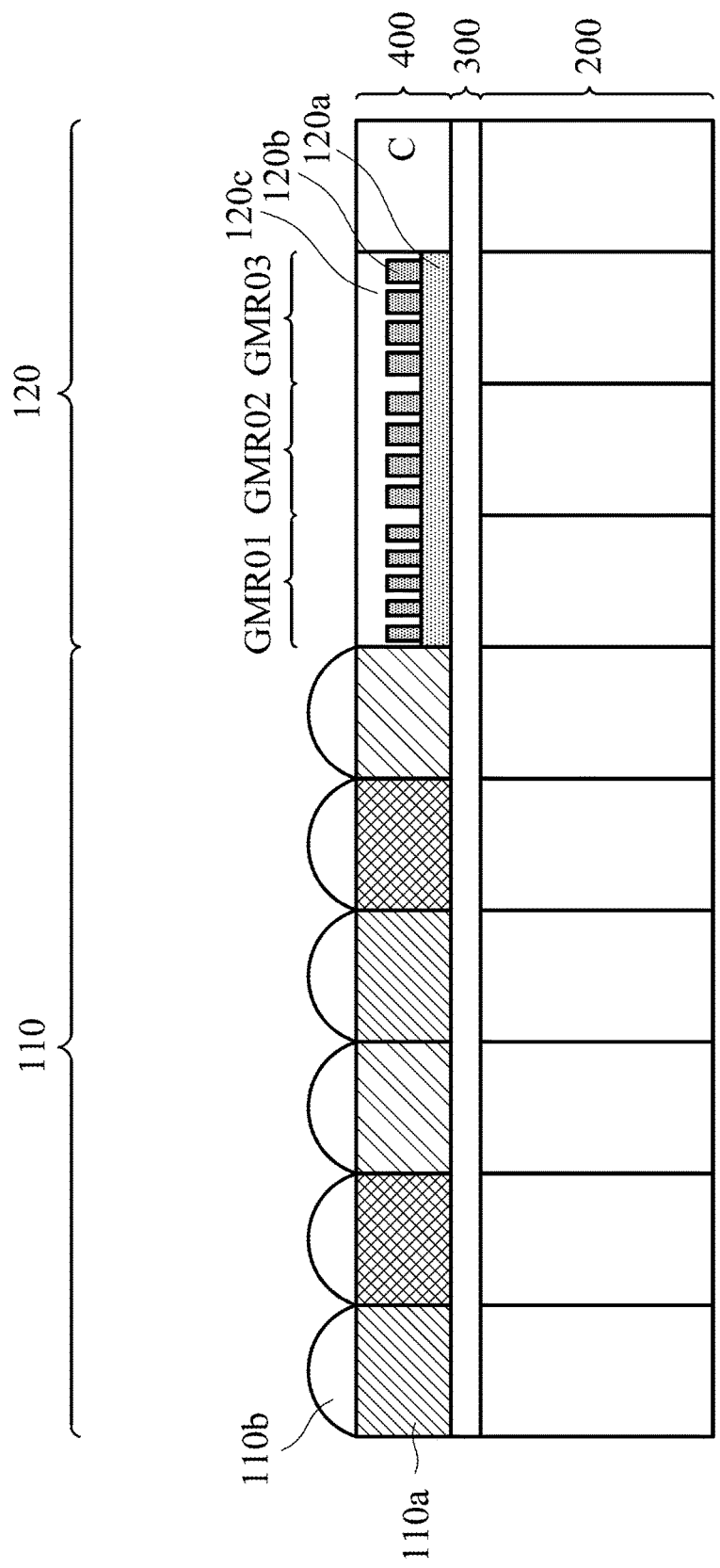
FIG. 9 is a schematic cross-sectional view of a portion of the image sensor in accordance of an embodiment of the disclosure.

Next, the vertical structure of the GMR unit will be described in detail. FIG. 9 is a schematic cross-sectional view of a portion of the image sensor in accordance of an embodiment of the disclosure. In FIG. 9, there are three layers laminated in the vertical direction, from bottom to top: a sensor array layer 200, a dielectric film 300, and a filter layer 400. The sensor array layer 200 includes a plurality of sensor units that convert light into electrical signals. The dielectric film 300 is disposed on the entire top surface of the sensor array layer 200 to provide electrical insulation. The filter layer 400 is disposed on the dielectric film 300 and includes the aforementioned color filter units 110 and at least one GMR unit set 120 (or 120A). Each of the color filter units 110 includes a filter portion 110a and a micro-lens portion 110b and occupies an area of a sensor unit. On the other hand, the GMR unit set 120 includes the grating areas and the clear area (only the grating areas GMR01, GMR 03 GMR 05, and the clear area C are shown in FIG. 9). The grating area and the clear area both occupy an area of a certain number of sensor units. The sensor units receive light passing through different elements including the color filter units 110 and the GMR unit set 120 to achieve different purposes. Therefore, the sensor units may be given different names according to their functions. Here, for ease of understanding, the sensor units covered by the color filter units 110 is also called normal sensor units, and the sensor units covered by the GMR unit set 120 is also called spectrometer sensor units.

In FIG. 9, a GMR unit includes a waveguide layer 120a, a grating layer 120b disposed on the waveguide layer 120a, and a transparent cladding layer 120c filled up the grooves of holes of the grating layer 120b. The waveguide layer 120a and the grating layer 120b can be made of the same or different materials. However, to perform the filtering function of a GMR structure, the reflective index of the GMR structure must be greater than refractive indexes of materials adjacent to the GMR structure. Namely, the effective reflective index of the waveguide layer 120a and the grating layer 120b should be greater than the refractive index of the dielectric film 300 and the refractive index of the transparent cladding layer 120c.

Figure 10:
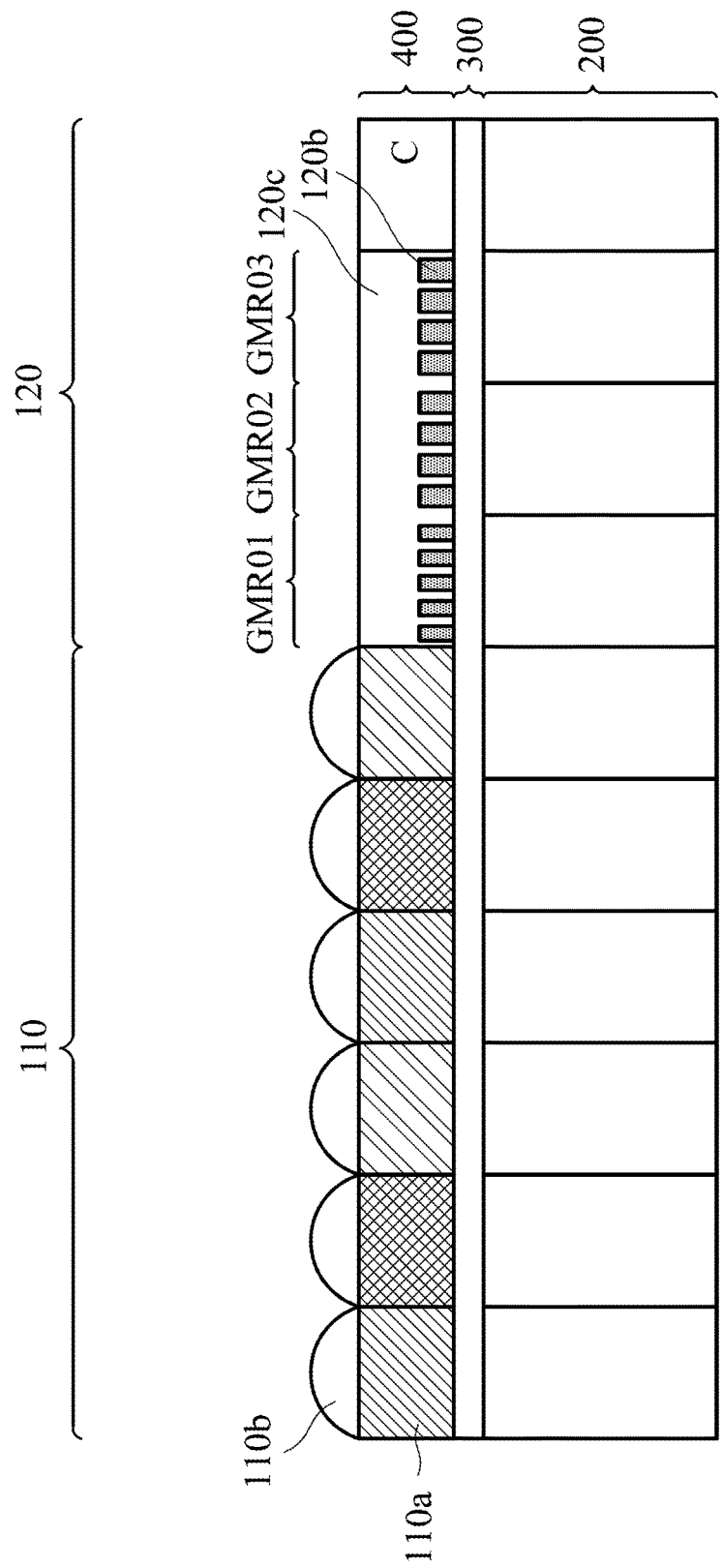
FIG. 10 is a schematic cross-sectional view of a portion of the image sensor in accordance of another embodiment of the disclosure.

FIG. 10 is a schematic cross-sectional view of a portion of the image sensor in accordance of another embodiment of the disclosure. In comparison with the previous embodiment shown in FIG. 9, this GMR unit doesn't have the waveguide layer 120a. It is a possible GMR structure as long as the grating layer 120b has a high enough reflective index. Also, the effective reflective index of the grating layer 120b should be greater than the refractive index of the dielectric film 300 and the refractive index of the transparent cladding layer 120c.

As described above, GMR units having different grating pitches can filter (or measure) light at different wavelengths. The larger the grating pitch of the GMR unit, the longer the wavelength of light that can be filtered (or measured). In this regard, the disclosure provides some embodiments to vary the grating pitch of the GMR unit to increase the number of measuring channels.

Figure 11A:
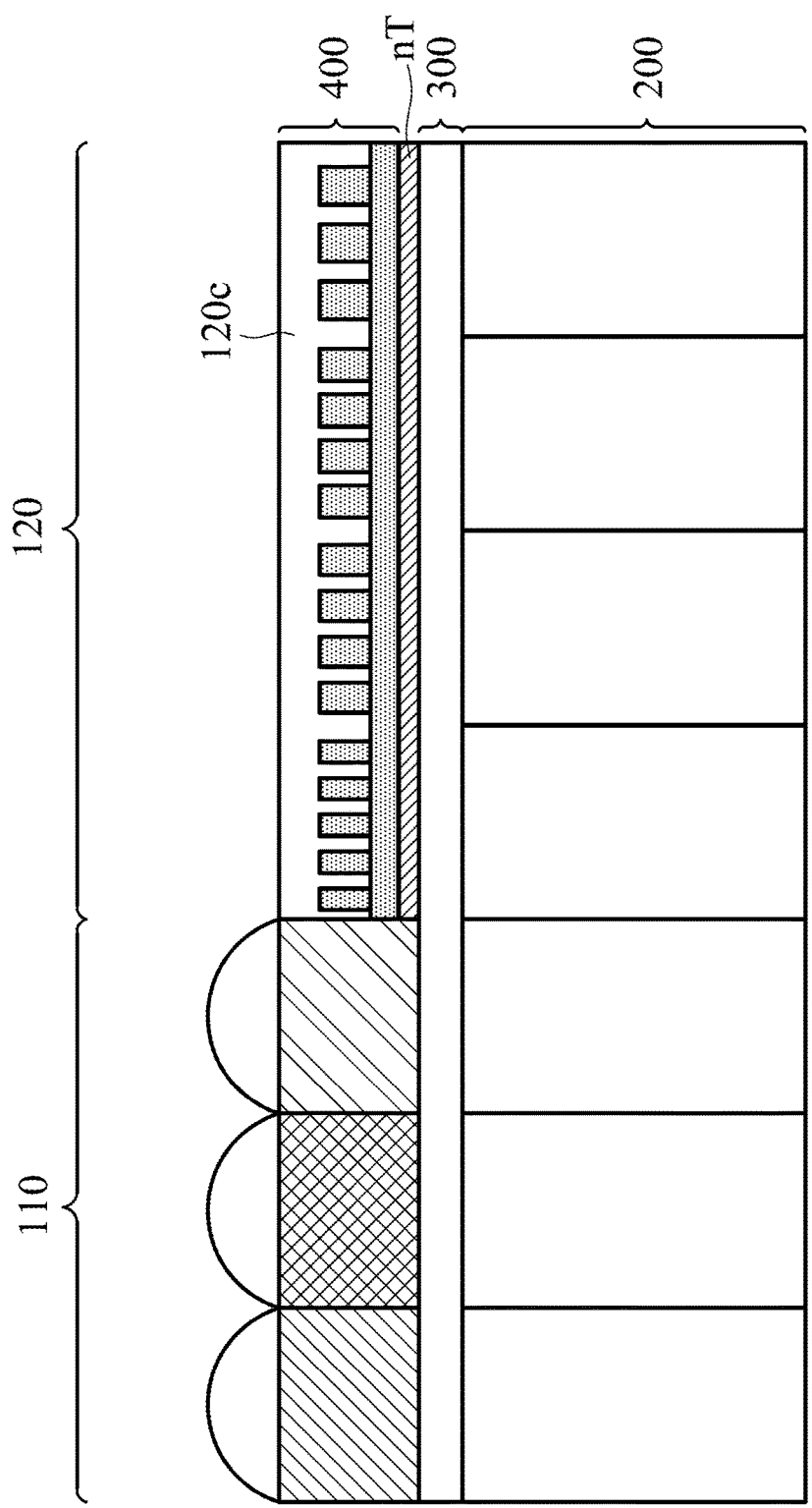
FIG. 11A is a schematic cross-sectional view of a portion of the image sensor in accordance of another embodiment of the disclosure.
Figure 11B:
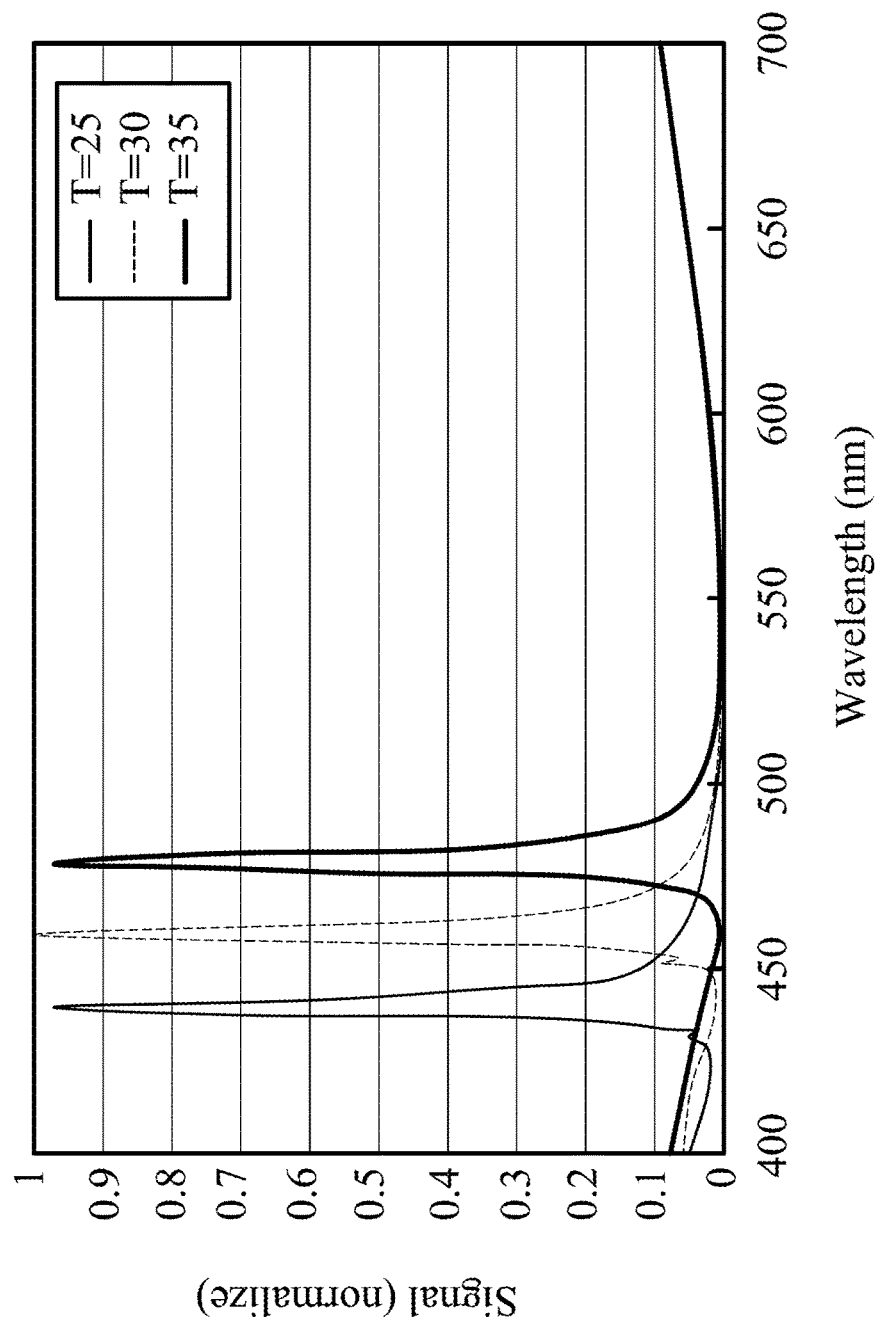
FIG. 11B is a diagram for explaining that the measured wavelength of the GMR unit shown in FIG. 11A can be varied.

FIG. 11A is a schematic cross-sectional view of a portion of the image sensor in accordance of another embodiment of the disclosure. FIG. 11B is a diagram for explaining that the measured wavelength of the GMR unit shown in FIG. 11A can be varied. As shown in FIG. 11A, a high thermal conductive layer nT is inserted between the dielectric film 300 and the GMR unit set 120 of the filter layer 400. This high thermal conductive layer nT may be made of, for example, gold, copper, etc. With this structure, a thermal source can be designed for the image sensor to heat or cool the GMR unit via the high thermal conductive layer nT. By utilizing the thermal expansion characteristics of materials, the grating pitch of the GMR unit will increase when the GMR unit is heated, and decrease when the GMR unit is cooled. Therefore, the grating pitch of one GMR unit can be varied to measure light at more wavelengths. For example, the grating area GMR00 is a GMR unit controlled to be heated or cooled to three temperatures: 25° C., 30° C., and 35° C. In this way, there will be three wavelengths measured by the grating area GMR00 as shown in FIG. 11B. Since one GMR unit can measure three wavelengths, seven GMR unit GMR00~GMR06 can measure twenty-one wavelengths in total. Therefore, the number of measuring channels is increased to perform the function of a spectrometer more precisely.

Figure 12A:
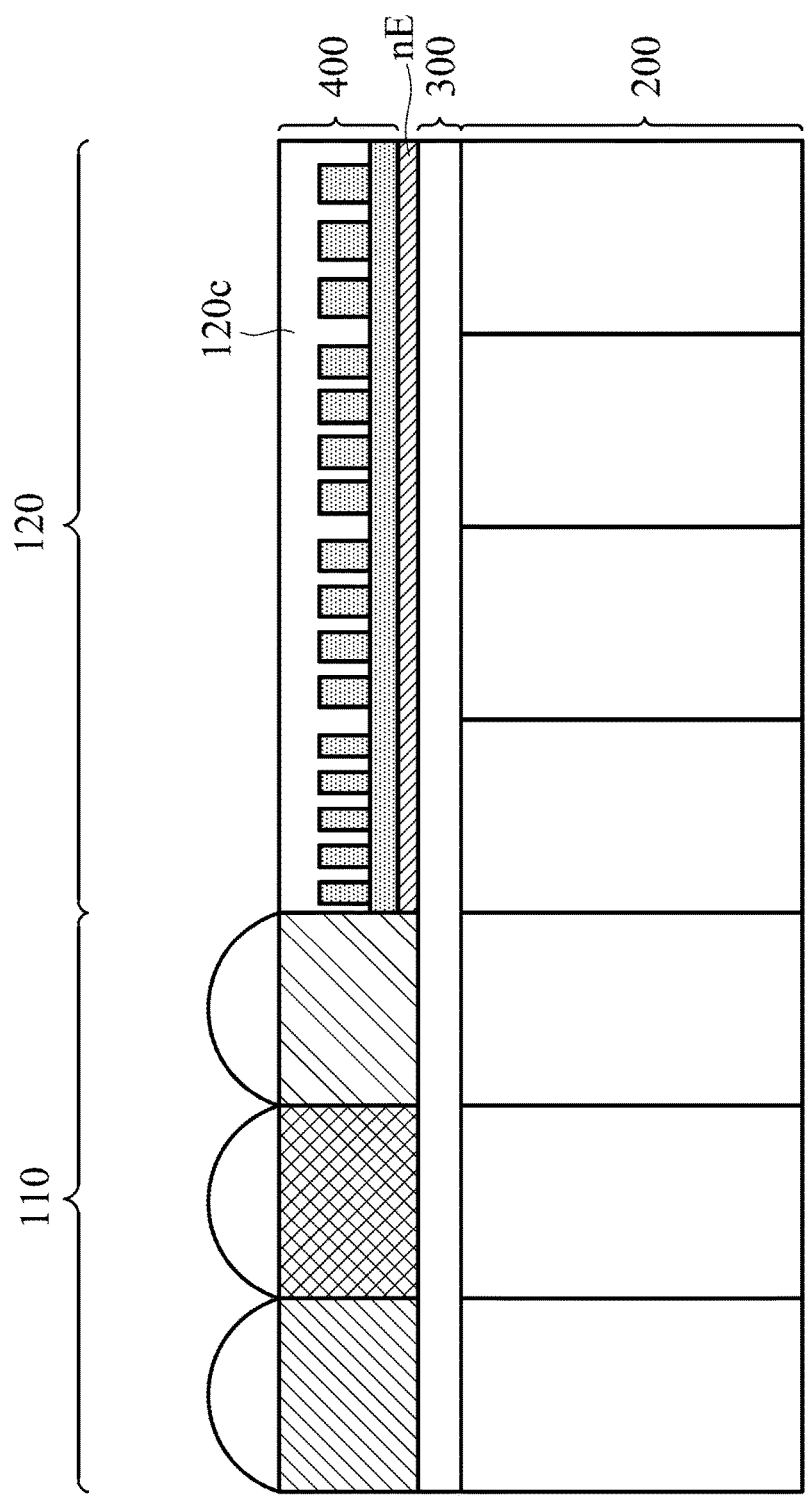
FIG. 12A is a schematic cross-sectional view of a portion of the image sensor in accordance of another embodiment of the disclosure.
Figure 12B:
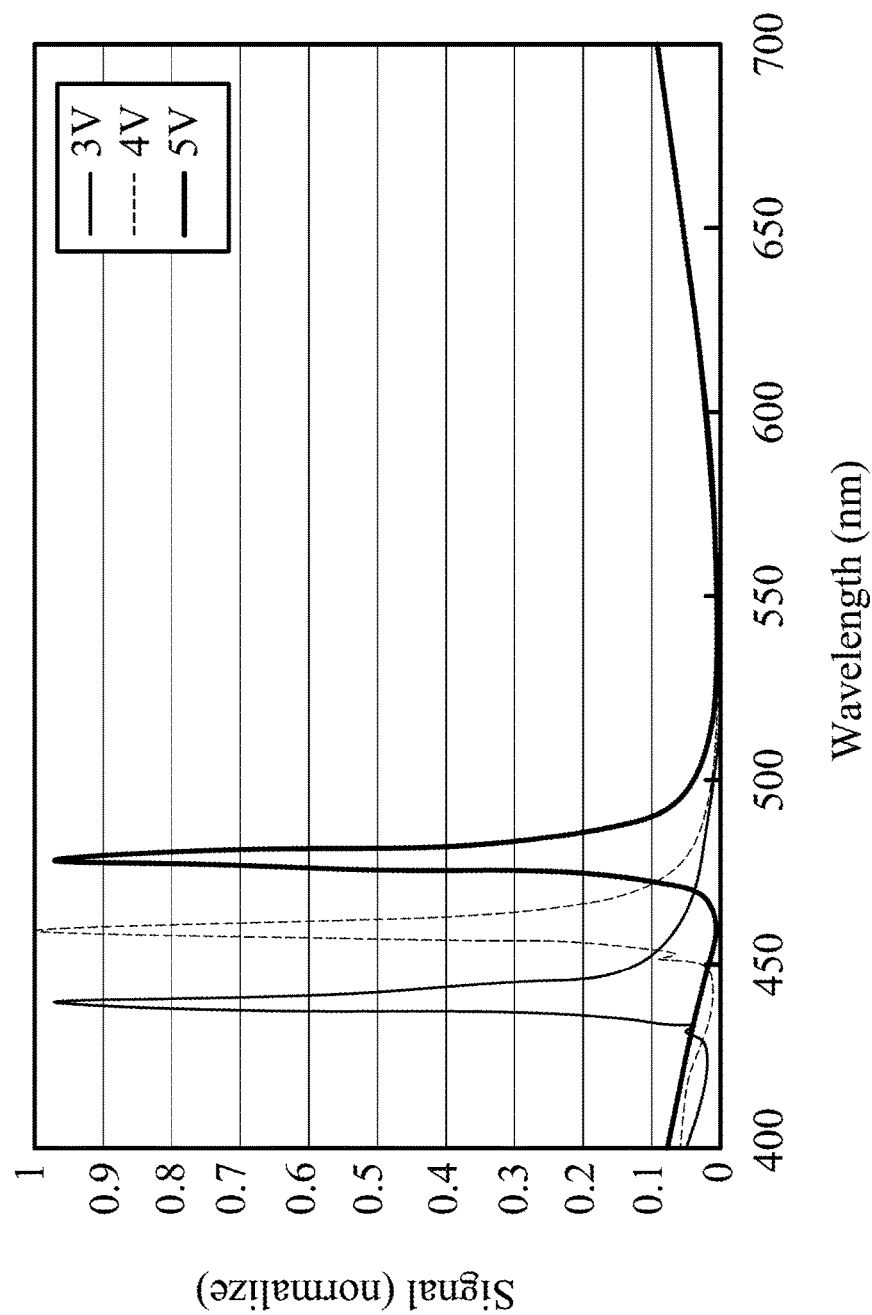
FIG. 12B is a diagram for explaining that the measured wavelength of the GMR unit shown in FIG. 12A can be varied.

FIG. 12A is a schematic cross-sectional view of a portion of the image sensor in accordance of another embodiment of the disclosure. FIG. 12B is a diagram for explaining that the measured wavelength of the GMR unit shown in FIG. 12A can be varied. As shown in FIG. 12A, a piezoelectric material nE, such as $BaTiO_3$, AlN, ZnO, etc, is inserted between the dielectric film 300 and the GMR unit set 120 of the filter layer 400. By utilizing the characteristics of piezoelectric materials, the grating pitch of the GMR unit can be changed by supplying different voltages to the piezoelectric material nE. Specifically, the grating pitch of the GMR unit will increase when the piezoelectric material nE is supplied with a higher voltage and decrease when the piezoelectric material nE is supplied with a lower voltage. Therefore, the grating pitch of one GMR unit can be varied to measure light at more wavelengths. For example, the grating area GMR00 which is a GMR unit controlled to be supplied with three voltages: 3V, 4V, and 5V. In this way, there will be three wavelengths measured by the grating area GMR00 as shown in FIG. 12B. Since one GMR unit can measure three wavelengths, seven GMR unit GMR00~GMR06 can measure twenty-one wavelengths in total. Therefore, the number of measuring channels is increased to perform the function of a spectrometer more precisely.

In a further embodiment, it is also possible that the waveguide layer 120a and the grating layer 120b themselves are made of piezoelectric materials to achieve similar effects.

According to the description above, all embodiments of a newly designed image sensor which cannot only capture images and videos, but also measure the spectrum of non-polarized or polarized light is provided. Furthermore, with some specific structure, the image sensor can change the grating pitch to increase the number of measuring channels.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An image sensor, comprising
a sensor array layer formed of a plurality of normal sensor units and a plurality of spectrometer sensor units;
a first guided mode resonance (GMR) structure having a first grating pitch and disposed on the sensor array layer to cover N (where N is a positive integer) of the spectrometer sensor units;
a second GMR structure having a second grating pitch and disposed on the sensor array layer to cover N of the spectrometer sensor units; and
a plurality of color filter units disposed on the sensor array layer to cover the normal sensor units; and
a clear structure having no gratings and disposed on the sensor array layer to cover N of the spectrometer sensor units.

2. An image sensor comprising
a sensor array layer formed of a plurality of normal sensor units and a plurality of spectrometer sensor units;
a first guided mode resonance (GMR) structure having a first grating pitch and disposed on the sensor array layer to cover N (where N is a positive integer) of the spectrometer sensor units;
a second GMR structure having a second grating pitch and disposed on the sensor array layer to cover N of the spectrometer sensor units; and
a plurality of color filter units disposed on the sensor array layer to cover the normal sensor units,
wherein the first GMR structure is divided into a first grating area with the first grating pitch and a first clear area without gratings, and the second GMR structure is divided into a second grating area with the second grating pitch and a second clear area without gratings.

3. The image sensor as claimed in claim 2, wherein the first clear area is arranged at a side of the first grating area, and the second clear area is arranged at a side of the second grating area.

4. The image sensor as claimed in claim 2, wherein the first clear area surrounds the first grating area, and the second clear area surrounds the second grating area.

5. The image sensor as claimed in claim 1, wherein the first GMR structure and the second GMR structure are arranged successively.

6. The image sensor as claimed in claim 1, wherein the first GMR structure and the second GMR structure are arranged dispersively.

7. The image sensor as claimed in claim 1, wherein the grating of the first GMR structure and the second GMR structure is a dot grating.

8. The image sensor as claimed in claim 1, further comprising:
a first polarizer polarizing light in a first direction is arranged on the first GMR structure, the second GMR structure, and the clear structure,
wherein the grating of the first GMR structure and second GMR structure is a line grating which is parallel to a second direction perpendicular to the first direction.

9. The image sensor as claimed in claim 8, further comprising a third GMR structure having the first grating pitch and disposed on the sensor array layer to cover N of the spectrometer sensor units;
a fourth GMR structure having the second grating pitch and disposed on the sensor array layer to cover N of the spectrometer sensor units;
a second clear structure having no gratings and disposed on the sensor array layer to cover N of the spectrometer sensor units; and
a second polarizer polarizing light in the second direction is arranged on the third GMR structure, the fourth GMR structure, and the second clear structure,
wherein the grating of the third GMR structure and the fourth GMR structure is a line grating which is parallel to the first direction.

10. The image sensor as claimed in claim 1, wherein each of the first GMR structure, the second GMR structure, and the clear structure occupies a rectangular area with a width of 1.1~4.4 μm and a length of 1.1~4.4 μm.

11. The image sensor as claimed in claim 1, wherein the first GMR structure measures a first signal, the second GMR structure measures a second signal, and the clear structure measures a reference signal,
wherein the difference between the first signal and the reference signal, and the difference between the second signal and the reference signal constitute a measured spectrum.

12. The image sensor as claimed in claim 2, further comprising:
a first polarizer polarizing light in a first direction is arranged on the first GMR structure and the second GMR structure,
wherein the grating of the first grating area and the second grating area is a line grating which is parallel to a second direction perpendicular to the first direction.

13. The image sensor as claimed in claim 12, further comprising:
a third GMR structure divided into a third grating area with the first grating pitch and a third clear area without gratings, the third GMR structure disposed on the sensor array layer to cover N of the spectrometer sensor units;
a fourth GMR structure divided into a fourth grating area with the second grating pitch and a fourth clear area without gratings, the fourth GMR structure disposed on the sensor array layer to cover N of the spectrometer sensor units; and
a second polarizer polarizing light in the second direction is arranged on the third GMR structure and the fourth GMR structure,
wherein the grating of the third grating area and the fourth grating area is a line grating which is parallel to the first direction.

14. The image sensor as claimed in claim 2, wherein the first grating area measures a first signal, the second grating area measures a second signal, the first clear area measures a first reference signal, and the second clear area measures a second reference signal,
wherein the difference between the first signal and the first reference signal, and the difference between the second signal and the second reference signal constitute a measured spectrum.

15. The image sensor as claimed in claim 1, wherein each of the first GMR structure and the second GMR structure comprises:
a waveguide layer disposed on a dielectric film;
a grating layer disposed on the waveguide layer; and a cladding layer disposed on the grating layer,
wherein an effective refractive index of the waveguide layer and the grating layer is greater than refractive indexes of the dielectric film and the cladding layer.

16. The image sensor as claimed in claim 1, wherein each of the first GMR structure and the second GMR structure comprises:
a grating layer disposed on a dielectric film; and
a cladding layer disposed on the grating layer,
wherein a refractive index of the grating layer is greater than refractive indexes of the dielectric film and the cladding layer.

17. The image sensor as claimed in claim 1, further comprising
a high thermal conductive material between the first GMR structure and the sensor array layer, and between the second GMR structure and the sensor array layer,
wherein the first grating pitch of the first GMR structure and the second grating pitch of the second GMR structure is varied by heating or cooling the first GMR structure and the second GMR structure via the high thermal conductive material.

18. The image sensor as claimed in claim 1, further comprising
a piezoelectric material arranged between the first GMR structure and the sensor array layer, and between the second GMR structure and the sensor array layer,
wherein the first grating pitch of the first GMR structure and the second grating pitch of the second GMR structure is varied by changing a voltage applied to the piezoelectric material.

19. The image sensor as claimed in claim 1, wherein the first GMR structure and the second GMR structure are made of a piezoelectric material,
wherein the first grating pitch of the first GMR structure and the second grating pitch of the second GMR structure is varied by changing a voltage applied to the piezoelectric material.

* * * * *